United States Patent [19]
Thibodeaux

[11] Patent Number: 5,293,887
[45] Date of Patent: Mar. 15, 1994

[54] ROBOTIC TANK CLEANING SYSTEM AND METHOD

[76] Inventor: Ray Thibodeaux, 23597 Joe May Rd., Denham Springs, La. 70726

[21] Appl. No.: 848,038

[22] Filed: Mar. 9, 1992

[51] Int. Cl.$^5$ ............................................. B08B 3/02
[52] U.S. Cl. ..................... 134/24; 134/111; 134/167 R; 134/169 R; 134/172; 239/743
[58] Field of Search .......... 134/105, 110, 111, 167 R, 134/168 R, 169 R, 172, 24, 22.1; 239/754, 724, 726, 732, 743

[56] References Cited

U.S. PATENT DOCUMENTS

| | | | |
|---|---|---|---|
| 1,628,141 | 5/1927 | Gray | 134/108 |
| 2,652,282 | 9/1953 | Willetts | 239/732 |
| 2,692,163 | 10/1954 | Geel | 239/754 |
| 2,746,072 | 5/1956 | Lumpkin | 239/754 X |
| 2,879,787 | 3/1959 | Ingram | 239/732 |
| 2,889,993 | 6/1959 | Willetts et al. | 239/732 X |
| 3,057,559 | 10/1962 | Ingram et al. | 285/6 |
| 3,477,178 | 11/1967 | Hulbert, Jr. | 134/167 R |
| 3,534,746 | 10/1970 | Posner | 134/167 R |
| 3,645,004 | 1/1972 | Webb et al. | 239/743 |
| 4,141,374 | 2/1979 | McMahan | 239/752 X |
| 4,777,971 | 10/1988 | Tribout et al. | 134/167 R X |
| 4,784,166 | 11/1988 | Brager et al. | 134/50 |
| 4,798,334 | 1/1989 | Harrington | 134/167 R X |
| 4,828,626 | 5/1989 | Meincke | 134/166 R X |
| 4,945,933 | 8/1990 | Krajicek | 134/167 R |

Primary Examiner—Frankie L. Stinson
Attorney, Agent, or Firm—William D. Kiesel; Robert C. Tucker; Warner J. Delaune, Jr.

[57] ABSTRACT

A robotic tank cleaning system is provided, comprising a light-weight, collapsible, and robotically controllable frame having an articulatable washing nozzle for spraying a petroleum-based solvent on a surface to be cleaned. Hydraulic power and control units are also provided which allow an operator to control the motion of the frame and washing nozzle from outside the tank, as well as a solvent supply system for delivering solvent to the washing nozzle. A hoisting mechanism is included to allow placement and retrieval of a waste removal pump, and a clearing blade is attached to the frame to assist movement of waste material to the waste removal pump. Waste material comprising dislodged oil sludge and expended solvent is collected in waste fractioning tanks where the collected oil sludge is allowed to settle below the expended solvent. The separated solvent in the waste fractioning tanks is redirected through the solvent supply system and is reused for further spraying of the tank interior. A sludge return pipeline delivers settled oil sludge from the waste fractioning tanks back to the refinery for further processing. A method of cleaning hydrocarbon storage tanks is also provided using the robotically controlled frame in conjunction with the waste removal, waste fractioning, and sludge return components.

27 Claims, 5 Drawing Sheets

ROBOTIC TANK CLEANING SYSTEM AND METHOD

BACKGROUND OF THE INVENTION

I. Field of the Invention

The present invention relates generally to remotely movable and articulatable robots used for cleaning surfaces with a sprayable liquid, and more particularly to such devices as used for cleaning the interiors of large oil and hazardous material storage tanks. This invention also relates to methods used for cleaning such tanks and to the recycling of cleaning liquids and waste materials accumulated during the cleaning process.

II. Description of Prior Art

Large cylindrical tanks are the primary containers used by refineries for the storage of various grades of crude oil prior to refinement into fuels and other lighter petroleum products. Over time, an accumulation of sediment is commonly experienced within the tank, as well as a congealing of the oil into a tar-like sludge. In order to maximize use of the tank and to minimize the impurities in the crude oil to be refined, cleaning of the tanks is occasionally required, wherein the sludge and sediment are removed by spraying the tank interior surfaces with a highly pressurized liquid. The cleaning liquid most often used is a petroleum-based solvent capable of dissolving the sludge, and is sometimes referred to as "cutter stock". Less often, water is used to achieve a similar, but less effective, result.

Typically, a number of workers will use high pressure hoses inside the tank and spray the cutter stock on the interior surfaces to dislodge the sludge material from the tank, and a pump is placed in a lower sink area or sump in order to suction out all of the mixture of cutter stock and sludge. This process is clearly strenuous and burdensome to the workers, primarily because of the toxic hydrocarbon vapors which are always present inside the tank, the weight of the spray hoses, and the high temperatures generated within the tank interior during the warmer months. Protective garments and masks are commonly worn to protect the workers' skin from exposure to harmful chemicals, but this only adds to the discomfort caused by the heat. Consequently, workers may only stay within the tank for short periods before leaving to rest, during which times replacement workers step in to continue the job. As a whole, this manual method of cleaning the tanks is uncomfortable, strenuous and dangerous for the reasons discussed.

In an attempt to alleviate most of the problems associated with the manual method, a device patented by Krajicek, et al., in U.S. Pat. No. 4,817,653 proposed a mobile tank cleaning, water washing robot having an articulatable spray nozzle. This device includes an open bottom frame having tank-type treads for locomotion, and an attached pump for removing accumulated waste water and material out of the tank. The motors which operate the treads, the attached waste removal pump and the spray nozzle are all powered by a hydraulic power system located outside the tank. The wash water supply is also situated outside of the tank, but the robot is controlled by an operator standing inside the tank. Some of the advantages disclosed by the Krajicek patent are that significantly higher water pressures and flow rates may be used because the spraying means is not held by human hands, only one operator need be stationed inside the tank in order to control the robot, and that the operator may safely stay within the tank for much longer periods due to the relative absence of any heavy labor compared to the manual method.

Several deficiencies exist, however, in the Krajicek device which must be overcome in order to provide the most efficient method of cleaning the interiors of hydrocarbon storage tanks, as well as to ensure the safety of the operator. Specifically, it is unclear whether Krajicek may be adapted for use with the cutter stock liquid described above. The use of water in that device tends to produce static electricity, which is extremely hazardous in the flammable environment inside the storage tank. Also, the waste removal pump in Krajicek is limited to removing waste materials directly in the path of the robot, because it is permanently attached to the frame. It is often desireable to suction the waste material from areas containing the greatest concentration of waste material and expended solvent, and the prior device must be diverted from continuous spraying in order to remove waste material from those areas. Additionally, while the Krajicek device is generally not hindered by debris and accumulated sludge in its path due to its large size and use of tank treads for locomotion, such a device is very bulky and heavy to move and potentially expensive to repair. Disassembly of that device is required before and after the tank cleaning process, and a scaffolding system must be constructed in order to move pieces of the device into and out of the tank.

Furthermore, regardless of which prior equipment or methods have been used to clean these tanks, no acceptable solution has been provided for the problem of disposal of the accumulated waste mixture. In too many instances, this waste mixture is simply dumped into a waste pit at the refinery site, or collected and disposed of through hazardous waste facilities. Given the heightened awareness of environmental issues by members of the public, government and industry, every attempt must now be made to minimize the effect of tank cleaning on the environment by incorporating in-process recycling of the cleaning liquids.

SUMMARY OF THE INVENTION

It is therefore an object of this invention to provide a robotic tank cleaning system that employs the use of a petroleum-based cutter stock for dissolving oil sludge and sediment inside the storage tank.

It is another object of this invention to provide a robotic tank cleaning system that is safer by allowing complete operation of the invention by an operator stationed outside the tank.

It is also an object of this invention to provide a robotic tank cleaning system whose movable frame is light, collapsible, and easily moved into and out of the tank interior.

Yet another object of this invention is to provide a robotic tank cleaning system which increases the efficiency of waste removal by using a remotely movable and separately operated waste removal pump to remove waste material from any desired location on the tank floor.

It is another object of this invention to provide a robotic tank cleaning method which involves recycling the used cleaning liquid from the waste material collected and re-using it during the cleaning process.

Yet another object of this invention is to provide a robotic tank cleaning method which involves returning the unusable waste material consisting primarily of oil sludge to the refinery for further processing.

These and other objects and advantages of the present invention will no doubt become apparent to those skilled in the art after having read the following description of the preferred embodiments which are contained in and illustrated by the various drawing figures.

Therefore, in a preferred embodiment, a robotic tank cleaning system is provided, comprising a light-weight, collapsible frame having robot articulation means mounted thereon for moving said frame; nozzled articulatable washing means mounted on said frame for spraying a petroleum-based solvent on a surface to be cleaned; waste removal means removably connectable to said frame for removing waste material comprising oil sludge and expended solvent from said tank and transferring said waste material to waste fractioning means; hoisting means operatively mounted on said frame for picking up, transporting and dropping off said waste removal means within said tank; hydraulic power means operatively connected with said robot articulation means, said waste removal means, and said articulatable washing means for articulating said frame and said washing means and for powering said waste removal means; hydraulic control means operatively connected with said hydraulic power means for regulating the operation of said robot articulation means and said articulatable washing means; waste fractioning means for receiving said waste material from said waste removal means and for allowing said oil sludge to settle below said expended solvent; solvent supply means operatively connected with said washing means and said waste fractioning means for delivering said solvent to said washing means; and sludge return means operatively connected between said waste fractioning means and a refinery pipeline for returning said oil sludge to said refinery for further refinement.

Also provided is a method for cleaning hydrocarbon storage tanks, comprising the steps of placing a robotically controlled frame having nozzled hydraulically powered articulatable washing means mounted on said frame for spraying a petroleum-based solvent on a surface to be cleaned and hydraulically powered robot articulation means mounted on said frame for moving said frame inside said tank; placing solvent supply means operatively connected to said washing means for delivering said solvent to said washing means, hydraulic power means operatively connected with said robot articulation means, and said washing means for articulating said frame and said washing means and for powering said waste removal means, and hydraulic control means operatively connected with said hydraulic power means for regulating the operation of said robot articulation means and said washing means substantially adjacent to the outside of said tank; supplying hydraulic power from said hydraulic power means to said robot articulation means and said washing means and supplying petroleum-based solvent from said solvent supply means to said washing means; spraying said surfaces with said washing means using said petroleum-based solvent to dislodge sludge from said tank; controlling said robot articulation means and said washing means outside said tank with said hydraulic control means until said sludge is satisfactorily dislodged; removing waste material comprising said sludge and said solvent sprayed from said washing means from said tank using waste removal means removably connectable to said frame for removing said waste material from said tank and transferring said waste material to waste fractioning means operatively connected to said waste removal means and said solvent supply means for receiving said waste material from said waste removal means, allowing said oil sludge to settle below said solvent, and delivering said solvent back to said solvent supply means; delivering said waste material to said waste fractioning means; allowing said sludge in said waste material transferred to said waste fractioning means to settle below said solvent contained in said waste material; returning said solvent in said waste fractioning means to said solvent supply means for further spraying by said washing means; and delivering settled sludge in said waste fractioning means to a refinery for further refinement.

DETAILED DESCRIPTION OF THE PREFERRED EMBODIMENT

Figure 4:
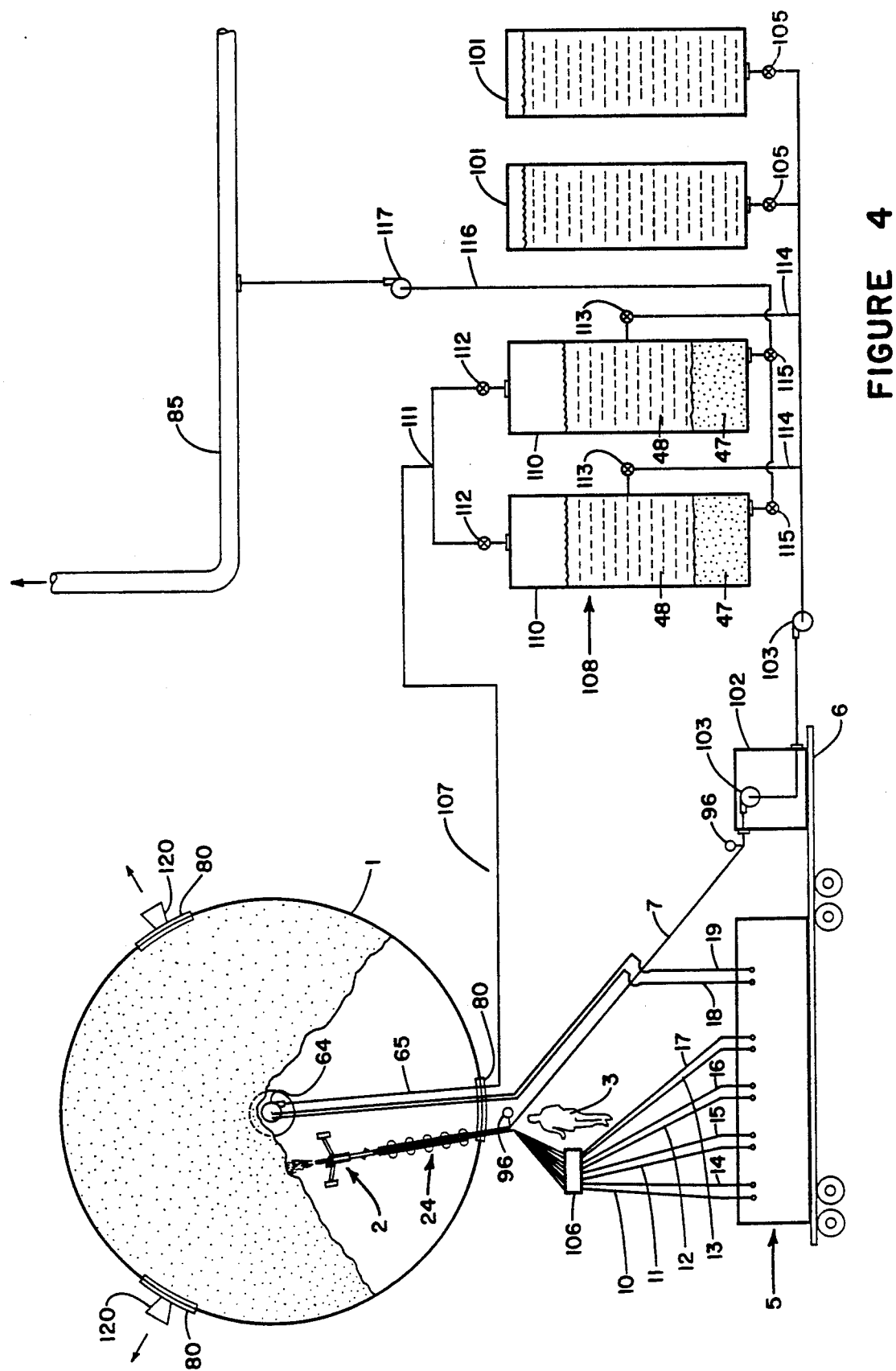
FIG. 4 is an overhead view of an oil storage tank being cleaned, the hydraulic power and control units, the tank cleaning II robot, the waste removal pump, the solvent supply tanks, and the waste fractioning tanks.

Turning now to a preferred embodiment of applicant's invention, FIG. 4 depicts an overhead view of tank cleaning system showing an oil storage tank 1, the tank cleaning robot 2, solvent supply means 4, hydraulic power means 5, hydraulic control means 106, waste removal means 107, waste fractioning means 108, and sludge return means 109.

Solvent supply means 4 will generally comprise one or more mobile solvent holding tanks 101, which hold large quantities, typically 500 barrels, of the solvent to be used for spraying the tank interior, as well as an intermediate tank 102 containing a supply pump 103 which pumps solvent through supply hose 7 to robot 2. Supply pump 103 is capable of generating a spraying pressure of about 300 pounds per square inch (PSI) and a flowrate of about 300 gallons per minute (GPM). The solvent pressure is monitored by two in-line pressure gauges 96, one of which is attached to supply hose 7 just outside storage tank I near operator 3, and another of which is attached to supply hose 7 immediately after its connection to supply pump 103. Holding tanks 101 are fluidically connected to each other and to intermediate tank 102 by way of a main supply line 104, and solvent is transferred from holding tanks 101 using gate valves 105 positioned thereon. Transfer pump 67 is located along main supply line 104 to facilitate the transfer of solvent from holding tanks 101 to intermediate tank 102.

Hydraulic power means 5 and intermediate tank 102 are preferably included as part of a mobile platform 6 which can be placed in a convenient location with respect to storage tank 1. Hydraulic power means 5 is comprised primarily of a hydraulic reservoir and pump (not shown) assembled in a manner familiar to those skilled in the art, and has at least five (5) external sets of supply/return fittings 29 for use with the various components to to operated, as will be explained below.

Figure 5:
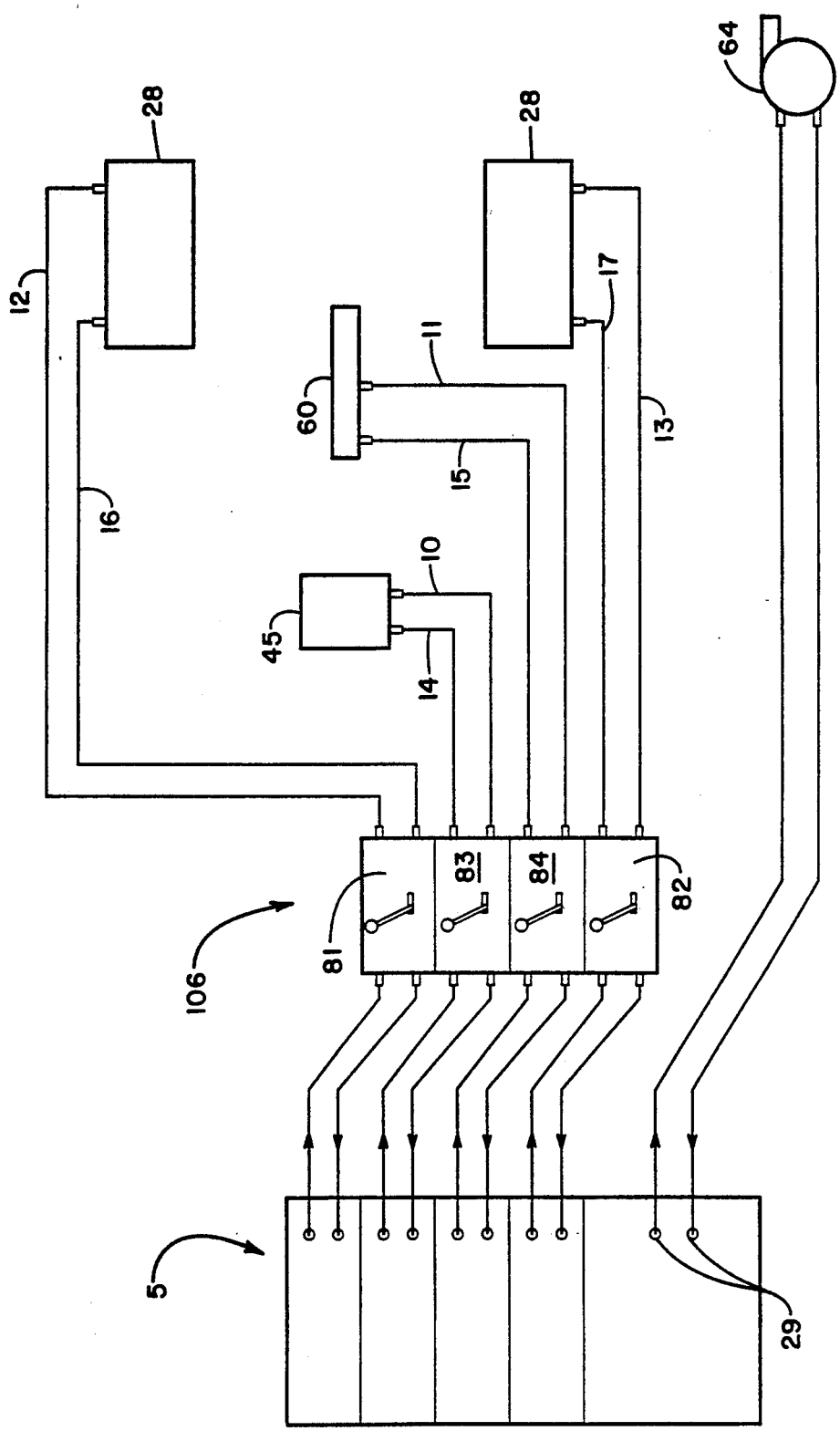
FIG. 5 is a hydraulic diagram showing the required connections for operation of the tank cleaning robot and the waste removal pump.

Hydraulic supply lines 10-13 and return lines 14-17, shown in more detail in FIG. 5, are connected on one end to hydraulic power means 5 and on the other end to hydraulic control means 106 which is comprised of hydraulic control valves 81-84. Both supply lines 10-13 and return lines 14-17 continue from hydraulic control means 106 to their appropriate connections on robot 2, and will be explained in more detail below.

Figure 1:
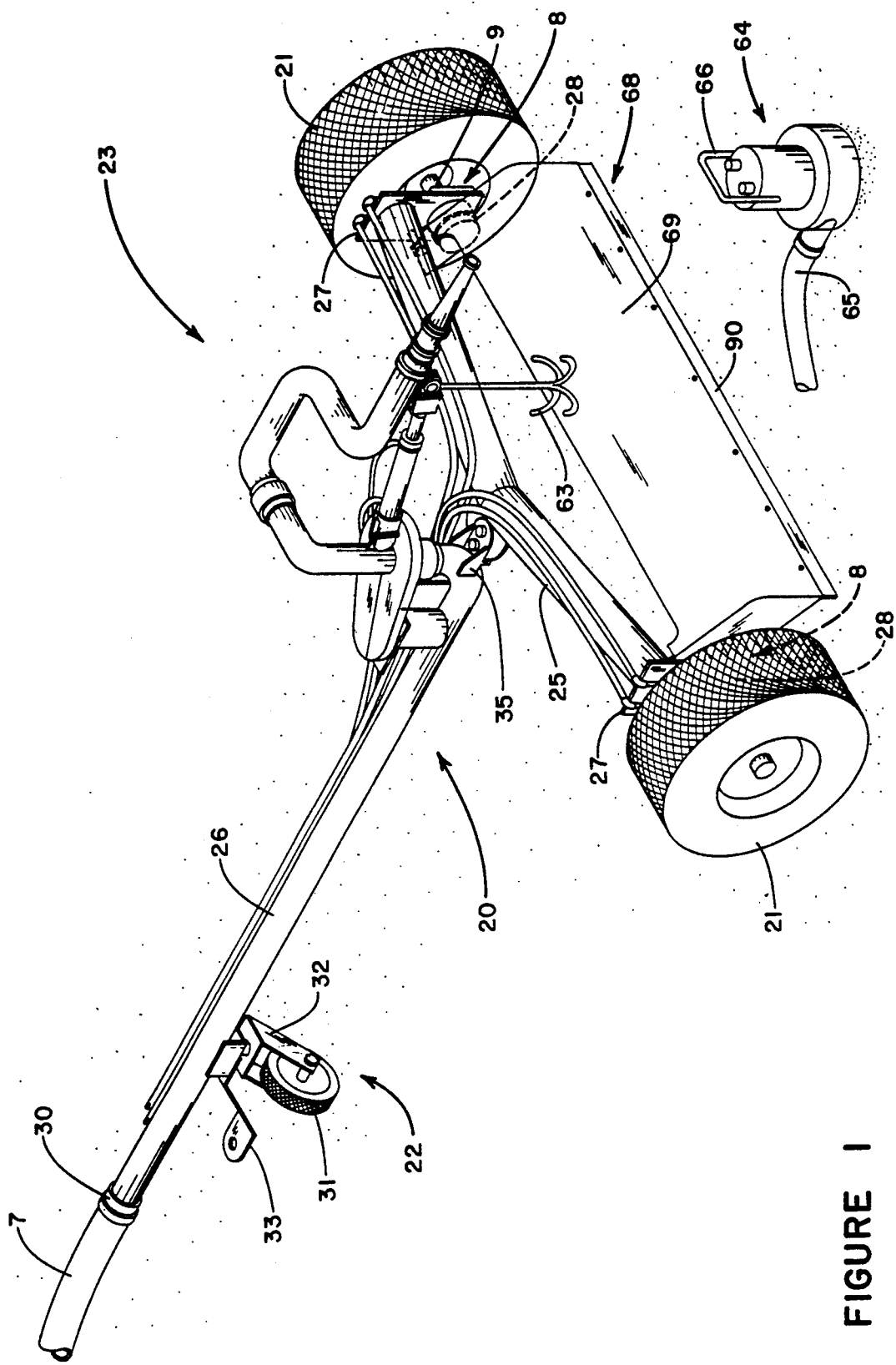
FIG. 1 is a view of the tank cleaning robot and the waste removal pump.
Figure 3:
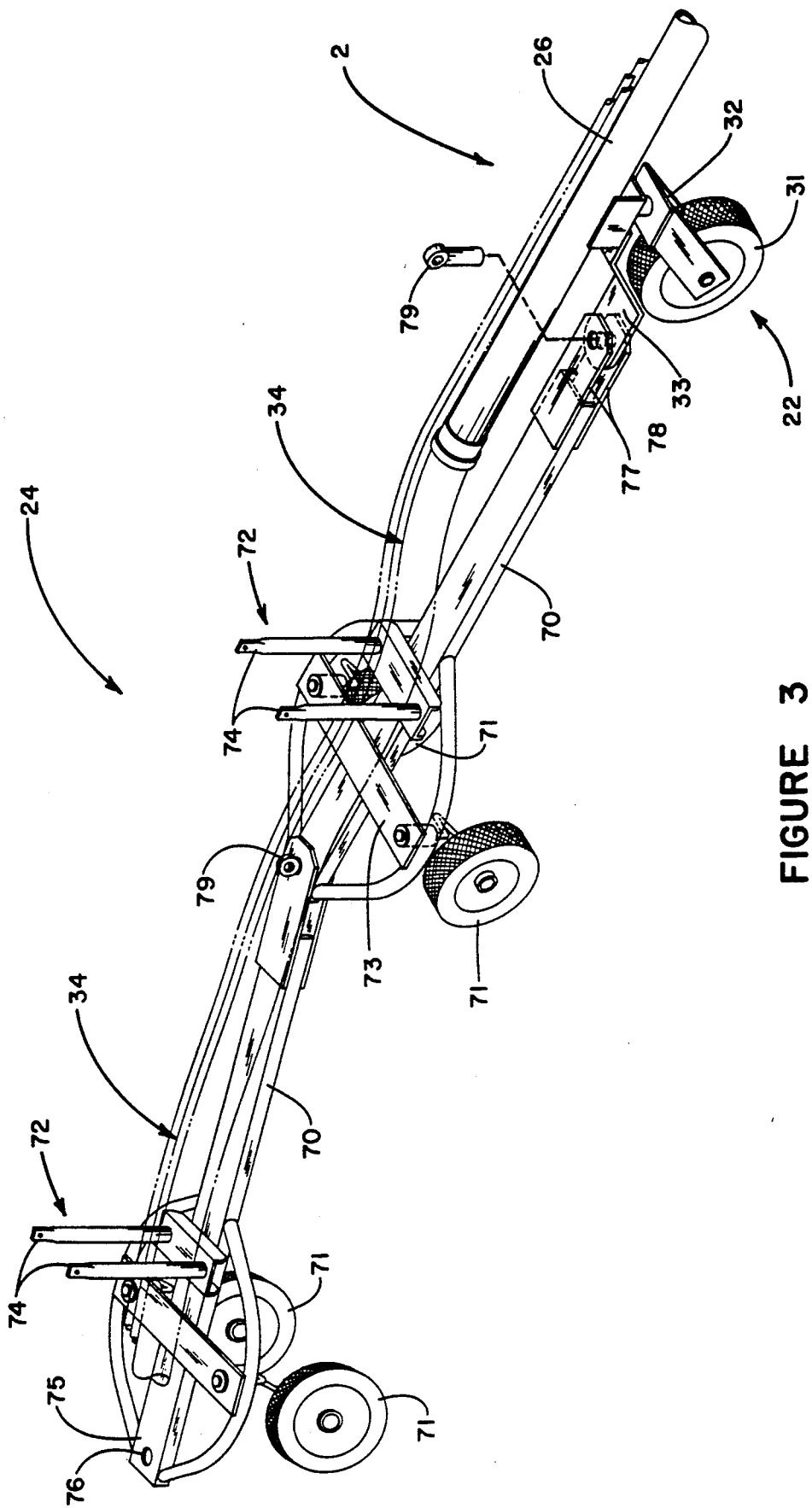
FIG. 3 is a view of two hose support carts connected to the II cart bracket of the tank cleaning robot prior to connection of the hydraulic supply and return lines and supply hose.

In FIG. 1, robot 2 is shown in detail and includes a frame 20, robot articulation means 8, trailing wheel 22, and washing means 23. Hose support train 24 is also included and is shown in FIG. 3. Robot articulation means 8 preferably comprises front tires 21, each actuated by hydraulic tire motors 28 fixedly connected to tire axle 9. Frame 20 consists of essentially two parts, namely the cross support tube 25 between front tires 21, and supply tube 26 to which trailing tire 22 is attached. Cross support tube 25 is preferably constructed of aluminum or other light-weight metal and forms an angle, preferably 15° at its midpoint such that front tires 21 are positioned slightly forward of the center of gravity of washing means 23 for stability. Attached in a vertical plane to each end of cross support tube 25 are axle plates 27 which serve as a support for tire axle 9 and hydraulic tire motor 28 for each front tire 21. Hydraulic tire motor 28 is attached to the inner side of each axle plate 27 and each is operated independently by hydraulic control means 106.

Figure 2:
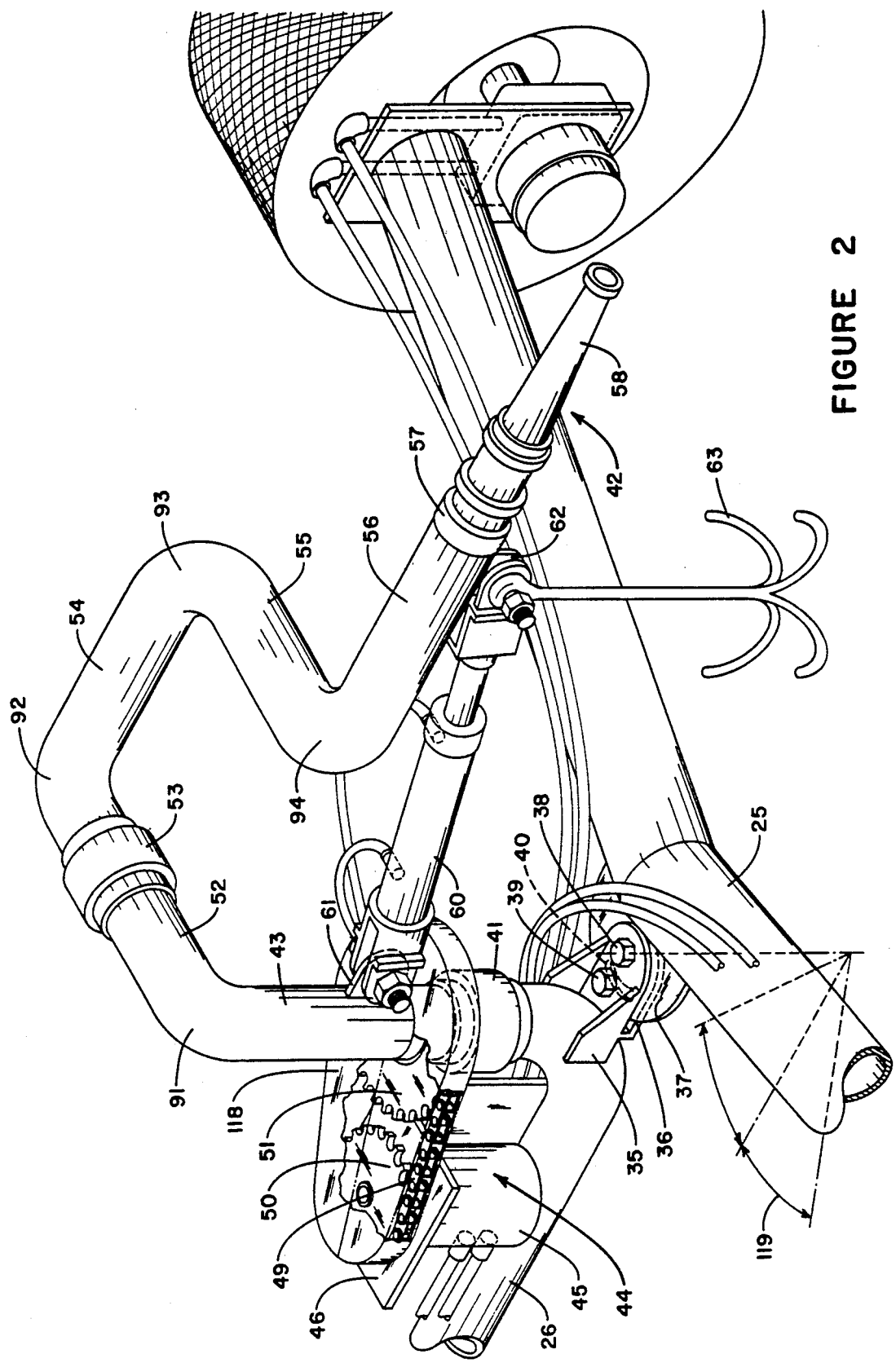
FIG. 2 is a detailed view of the horizontal and vertical control mechanisms of the spray nozzle, the grappling hook, and the front wheel assembly.

Supply tube 26 is an elongated hollow tube which acts in part as support for washing means 23 as well as to supply solvent to washing means 23. Supply tube 26 is also pivotable with cross support tube 25 and includes trailing wheel 22. On its rear end, supply tube 26 is open to accept supply hose 7 for attachment by threaded collar 30. Trailing wheel 22 may simply be a pivotable caster-type wheel 31 attached to a caster bracket 32 welded to supply tube 26. Hose support cart bracket 33 also is attached to supply tube 26 and extends toward the rear of robot 2 to pivotally join with a first of several serially connected hose support carts 34, as shown in FIG. 3. Referring additionally to a more detailed depiction of washing means 23 and frame 20 in FIG. 2, the front end of supply tube 26 contains a pivot bracket 35 having two horizontally parallel plates 36 designed to mate with pivot plate 37 attached to the rear of the midpoint of cross support tube 25. Pivot pin 38 is inserted through aligned holes (not shown) in both parallel plates 36 and in pivot plate 37 to pivotally connect cross support tube 25 to supply tube 26. In order to prevent frame 20 from "jack-knifing", the degree to which supply tube 26 may pivot should be no more than about 20° from a center position as shown by pivot angle 119. Therefore, any manner of mechanically limiting the motion of supply tube 26 in this way would be suitable, such as by using a spring-loaded pin 39 attached to pivot bracket 35 into a curved slot 40 formed in pivot plate 37. Front end of supply tube 26 forms a 90° bend upward near pivot bracket 35 and is connected with washing means 23 by way of horizontal rotary joint 41 which allows nozzle 42 to be moved in a horizontal plane and which maintains fluidic communication between supply tube 26 and first tube section 43.

Washing means 23 is generally comprised of horizontal control means 44, vertical control means 59, and a series of tube sections 43, 52, 54-56. Horizontal control means 44 creates the notion of nozzle 42 in a horizontal plane. Hydraulic horizontal motion motor 45 is bolted to motor bracket 46 which is in turn attached to supply tube 26 behind pivot bracket 35. Motor 45 includes a motor shaft (not shown) to which driver sprocket 50 is fixedly attached in a horizontal plane. Driver sprocket 50 meshes with chain 49 which in turn meshes with horizontal motion sprocket 51 which is fixed to vertical first tube section 43, thus allowing for reciprocating motion of nozzle 42 in a horizontal plane. To protect the mechanical components of horizontal control means 44, chain guard 118 is attached to motor bracket 46.

First tube section 43 forms a first 90° bend 91 toward the side of frame 20 to connect to second tube section 52 where vertical rotary joint 53 is attached which allows nozzle 42 to be moved in a vertical plane and which maintains fluidic communication between second tube section 52 and the flow path through the remaining tube sections 54-56. Third tube section 54 is formed after a second 90° bend 92 in second tube section 52 toward the front of frame 20 and continues until it forms a third 90° bend 93 toward the middle of frame 20 to form fourth tube section 55. Fourth tube section 55 forms a fourth 90° bend 94 toward the front of frame 20 in order to form fifth tube section 56 which directs solvent flow away from robot 2. Nozzle 42 is attached by way of threaded coupling 57 to the end of fifth tube section 56, and contains a tapered exit portion 58 for increasing the liquid pressure leaving nozzle 42.

Vertical control means 59 comprises a double-acting hydraulic cylinder and ram 60 connected on one end to a rear bracket 61 welded to the front side of first tube section 43 and on the other end to a front bracket 62 welded to the underside of fifth tube section 56. Movement of ram 60, therefore, effectuates motion of nozzle 42 in a vertical plane. Because of the lifting strength associated with hydraulic ram 60, a hoisting capability of the present invention is readily obtainable. Therefore, grappling-type hook 63 is also suspended from fifth tube section 56 near nozzle 42 in order to pick up and deposit a waste removal pump 64 to desired locations within tank 1, as explained below.

Waste removal pump 64, as shown in FIG. 6, is a separate hydraulic centrifugal pump powered by hydraulic supply and return lines 18, 19 connected to hydraulic power means 5 on mobile platform 6. Pump 64 is generally of a low-speed type capable of handling non-Newtonian waste material such as the dissolved oil sludge mixed with the used cutter stock solvent, and is connected to a 3-inch diameter discharge hose 65 for delivering the waste material out of tank I for later separation of the oil sludge from the expended solvent in the waste fractioning means 108 as described below. Handle 66 is attached to pump 64 for either manually handling pump 64 or grasping it by way of hook 63 suspended from fifth tube section 56.

To facilitate the movement of waste material to waste removal pump 64 during the cleaning process, clearing blade 68 is attached to cross support tube 25 by either welding or bolting along the front of robot 2. Clearing blade 68 may simply be a rigid metal plate 69 which includes an attached rubberized strip 90 along the bottom edge of plate 69, or any other similar attachment capable of moving the accumulated waste material and expended cutter stock solvent away from the sprayed areas.

As shown in FIG. 3, each hose support cart 34 generally includes a main support member 70, a pair of wheels 71, and a hose guide 72. Wheels 71 are preferably 360° pivoting caster-type wheels and are attached to a cross bar 73 transversely attached to main support member 70. Hose guide 72 may simply be a pair of vertical members 74 tall enough to retain the assembly of hydraulic supply and return lines 10-17 and the solvent supply hose 7 extending from the robot 2 during operation. Flat mating portion 75 having a hole 76 is formed on the rear end of cart 34 for attachment with other trailing carts 34. On the front end of each cart 34, a pair of parallel plates 77 having aligned holes 78 is used to engage mating portion 75 of a preceding cart 34 or the hose cart bracket 33 on supply tube 26 by insertion of a connection pin 79 through holes 78.

Waste fractioning means 108 comprises one or more fractioning tanks 110 similar to holding tanks 101 of solvent supply means 4. In a preferred embodiment, each of two fractioning tanks 110 is connected to the ends of a T-section pipe ill which in turn is connected to receive waste material from discharge hose 65. Waste material gate valves 112 are located just above each fractioning tank 110 for regulating the flow of waste material thereinto. Solvent recovery gate valves 113 are also located on each fractioning tank 110 at a height which allows recovery of expended solvent 48 without removing any of the heavier sludge 47 accumulated at the bottom of the fractioning tanks 110. Recovered solvent 48 can thus be delivered back into main supply line 104 it through recovery lines 114 connected thereto. Sludge exit valves 115 are located at the very bottom of each fractioning tank 110 and are connected to sludge return line 116 which delivers accumulated oil sludge 47 back to a pipeline 85 leading to the refinery. Movement of the sludge 47 through the sludge return line 116 is facilitated by operation of a sludge pump 117 operated by electrical power provided on-site by the refinery.

In operation, and as shown in FIG. 4, the mobile platform 6 containing intermediate tank 102, supply pump 103, and hydraulic power means 5 is parked close enough to storage tank 1 so that robot 2 may freely traverse the distance between circumferentially adjacent manhole entrances 80 once all line and hose connections are made. Spring-loaded pin 39 in supply tube pivot bracket 35 is 11 disengaged to allow supply tube 26 to collapse toward cross support tube 25, and the entire frame 20 is inserted into the manhole entrance 80 to storage tank 1. Once frame 20 is re-expanded to conform to its working configuration, spring-loaded pin 39 engages curved slot 40 so as to limit the pivoting between supply tube 26 and cross tube 25 to about 20' to either side. Supply hose 7 is connected to the threaded collar 30 of supply tube 26, and the hydraulic supply lines 10-13 and return lines 14-17 are connected to the horizontal motion motor, vertical motion cylinder, and left and right tire motors, respectively, as shown in FIG. 5. The opposite end of supply hose 7 is connected to intermediate tank 102, and the opposite ends of hydraulic supply and return lines 10-17 are connected to hydraulic control valves 81-84. Hydraulic control valves 81-84 are stationed outside of tank 1 and next to manhole entrance 80, and consist of two 4-way float position directional control valves 81, 82 for operating front tires 21, a 4-way directional control valve 83 for horizontal motion control of washing means 23 and a 4-way directional control valve 84 for vertical motion control of washing means 23. Hydraulic supply and return lines 10-13, 14-17 continue from hydraulic control valves 81-84 to the hydraulic power means 5 to complete the hydraulic circuit.

Waste removal pump hydraulic supply line 18 and return line 19 are connected on one end to waste removal pump 64 and on their opposite end to hydraulic power means 5 as shown in FIG. 5, and is operated separately from the robot 2 directly from controls on hydraulic power means 5. Discharge hose 65 is also connected on one end to pump 64, extends outside of tank 1, and connects on the other end to waste fractioning means 108. Pump 64 is hung from hook 63 suspended from front bracket 62, and hydraulic power is sent to the tire hydraulic motors 28 and hydraulic ram 60 on robot 2 so that robot 2 may lift pump 64 and deliver it to the desired location. Hydraulic ram 60 is operated to lower pump 64 to tank floor 95 until hook 63 disengages itself from handle 66 on pump 64. Air movers 120 capable of air pressures of about 125 PSI and operated from electricity supplied by the refinery are also attached to the other manhole entrances 60 in order to circulate toxic fumes outside of storage tank 1.

Solvent supply means 4 is then actuated to deliver the cutter stock to washing means 23, and cleaning of tank 1 is commenced by controlling the position of nozzle 42 and robot 2 by way of hydraulic control valves 81-84 until sludge is gradually dislodged from the surfaces of tank 1. Operator 3 still retains control of the movement of robot 2 by applying power to tire motors 28. Waste removal pump 64 is then energized from the hydraulic power means 5 to begin suctioning out dislodged sludge and expended cutter stock for delivery to the waste fractioning tanks 110.

Waste material collected in fractioning tanks 110 is allowed to settle to the extent that the sludge 47 becomes concentrated below the expended solvent 48. Expended solvent 48 inside fractioning tanks 110 is then transfered back into main supply line 104 by opening solvent recovery valves 113 so that solvent 48 may again be used to spray the interior of tank 1. At some point during the cleaning process, the collected waste material will have such a high concentration of sludge 47 that the viscosity of the liquid being returned to main supply line 104 will result in decreased pressure readings on in-line pressure gauges 96. When the pressure drops to about 250 PSI, an operator 3 can switch to another fractioning tank 110 by opening another gate valve 112 on the empty fractioning tank 110 and closing the gate valve 112 on the fractioning tank 110 filled mostly with sludge 47. Sludge 47 existing at the bottom of fractioning tank 110 is removed through sludge exit valves 115 and delivered to sludge return line 116 where sludge pump 117 assists movement of sludge 47 to the refinery pipeline 85. Meanwhile, the cleaning procedure is continued using the other fractioning tank 110 until tank 1 is satisfactorily cleaned and all of the sludge 47 is returned to the refinery 86.

Although the present invention has been described in terms of specific embodiments, it is anticipated that alterations and modifications thereof will no doubt become apparent to those skilled in the art. For example, it should be understood that the mechanical features described herein, such as pump, hoisting means, clearing blade and sweep control mechanism, are entirely suited for use in a water-based system such as seen in the prior art. It is therefore intended that the following claims be interpreted as covering all such alterations and modifications as fall within the true spirit and scope of the invention.

I claim:

1. A robotic cleaning system for hydrocarbon storage tanks, comprising:
   (a) a light-weight, collapsible frame having robot articulation means mounted thereon for moving said frame within said tank, said tank having a floor;
   (b) nozzled articulatable washing means mounted on said frame for spraying a petroleum-based solvent on a surface to be cleaned;
   (c) waste removal means removably connectable to said frame for removing waste material comprising hydrocarbon sludge and expended solvent from said tank and transferring said waste material to waste fractioning means;
   (d) hoisting means operatively mounted on said frame for picking up, transporting and dropping off said waste removal means within said tank;
   (e) hydraulic power means operatively connected with said robot articulation means, said waste removal means, and said articulatable washing means for articulating said frame and said washing means and for powering said waste removal means;
   (f) hydraulic control means operatively connected with said hydraulic power means for regulating the operation of said robot articulation means and said articulatable washing means;
   (g) solvent supply means operatively connected with said washing means for delivering said solvent to said washing means;
   (h) waste fractioning means operatively connected to said waste removal means and said solvent supply means for receiving said waste material from said waste removal means, allowing said hydrocarbon sludge to settle below said expended solvent, and delivering said expended solvent back to said solvent supply means; and
   (i) sludge return means operatively connected between said waste fractioning means and a refinery pipeline for returning said hydrocarbon sludge to said refinery for further refinement.

2. A system according to claim 1, wherein said frame comprises a cross support member having a midpoint, and a rigid and hollow solvent supply tube having an front end and a rear end, said front end being pivotally attached to said midpoint of said cross support member and having an opening for allowing fluid communication between said solvent supply tube and said washing means, and said rear end having an opening to accept a solvent supply hose and also having a pivotable trailing wheel; and wherein said robot articulation means comprises:
   (i) a first vertical plate attached to one end of said cross support member, and a second vertical plate attached to the opposite end of said cross support member, each said plate having a portion extending downward from said cross support member;
   (ii) first and second hydraulic motors operatively attached to said downwardly extending portion of said first and second plates, respectively; and
   (iii) first and second wheels operatively attached to said first and second hydraulic motors, respectively.

3. A system according to claim 2, wherein said rear end of said solvent supply tube further comprises a cart bracket having a horizontal stem portion including a hole therethrough, and further comprising hose support means connected to said cart bracket for holding hoses extending from said frame and preventing said hoses from becoming entangled with said frame.

4. A system according to claim 3, wherein said hose support means comprises a plurality of serially connected hose support carts having means pivotally matable with said cart bracket and other said hose support carts for allowing serial interconnection therebetween.

5. A system according to claim 4, wherein said hose support cart comprises:
   (i) a main support member having a front portion comprised of two horizontal parallel plates having aligned holes therethrough for pinned and pivotable engagement with said cart bracket;
   (ii) a cross bar operatively attached transverse to said main support member;
   (iii) first and second caster wheels operatively attached beneath opposite ends of said cross bar; and
   (iv) hose support guiding means operatively attached to said cross bar for retaining hoses extending from said frame above the floor of said storage tank.

6. A system according to claim 2, further comprising clearing means operatively connected to said cross support member for clearing said waste material from the floor of said hydrocarbon storage tank and directing said waste material to said waste removal means.

7. A system according to claim 6, wherein said clearing means comprises:
   (i) a support structure operatively attached to said cross support member, said support structure having a bottom edge of a width greater than or equal to the distance between the outer edges of said first and second wheels; and
   (ii) a rubberized, chemically resistant strip operatively attached to said bottom edge of said support structure such that said strip is in wiping contact with said floor of said storage tank.

8. A system according to claim 1, wherein said nozzled articulatable washing means comprises:
   (i) a 2-degree of freedom tubing system operatively connected to said solvent supply means and terminating in a nozzle;
   (ii) horizontal control means operatively attached to said tubing system for causing said tubing system to spray said solvent in a horizontal arc; and
   (iii) vertical control means operatively attached to said tubing system for causing said tubing system to spray said solvent in a vertical arc.

9. A system according to claim 8, wherein said tubing system comprises:
   (i) a first tube assembly;
   (ii) a horizontal rotary joint operatively attached between one end of said first tube assembly and said solvent supply means to allow horizontal rotation and fluidic communication between said first tube assembly and said solvent supply means;
   (iii) a vertical rotary joint operatively attached to an opposite end of said first tube assembly to allow vertical rotation and fluidic communication between said first tube assembly and a second tube assembly;
   (iv) a second tube assembly operatively attached on one end to said vertical rotary joint; and
   (v) a nozzle operatively attached to an opposite end of said second tube assembly.

10. A system according to claim 8, wherein said horizontal control means comprises:

(i) a first horizontal sprocket operatively attached to said first tube assembly;

(ii) a hydraulic horizontal motion motor operatively attached to said frame, said motor having a motor shaft;

(iii) a second horizontal sprocket operatively attached to said motor shaft; and (iv) a sprocket chain operatively displaced between said first and second horizontal sprockets; and wherein said vertical control means comprises a hydraulic ram pivotally attached on one end to said first tube assembly and on an opposite end to said second tube assembly in a manner to produce vertical motion of said nozzle.

11. A system according to claim 10, wherein said hydraulic control means comprises:

(i) first, second, third, and fourth hydraulic fluid supply lines interconnected between said first and second hydraulic motors, said horizontal motion motor, and said hydraulic ram, respectively, and said hydraulic power means;

(ii) first, second, third, and fourth hydraulic return lines interconnected between said first and second hydraulic motors, said horizontal motion motor, and said hydraulic ram, respectively, and said hydraulic power means; and (iii) first, second, third, and fourth 4-way directional control valves operatively connected to said first, second, third, and fourth hydraulic supply and return lines between said first and second hydraulic motors, said horizontal motion motor, and said hydraulic ram, respectively, and said hydraulic power means.

12. A system according to claim 9, wherein said hoisting means comprises a grappling hook pivotally suspended from said second tube assembly of said tubing system for releasing and retrieving said waste removal means in conjunction with the operation of said vertical control means.

13. A system according to claim 1, wherein said waste removal means comprises:

(i) a hydraulic centrifugal pump having a handle shaped to allow attachment to and removal from said hoisting means;

(ii) a discharge hose operatively connected on one end to said pump and on an opposite end to said waste fractioning means; and (iii) supply and return hydraulic fluid lines operatively connected on one end to said pump and on an opposite end to said hydraulic power means.

14. A system according to claim 1, wherein said solvent supply means comprises:

(i) one or more holding tanks, each said holding tank having an outlet port;

(ii) a main supply pipe operatively connected on one end to said outlet ports of said holding tanks, said main supply pipe having an opposite end;

(iii) an intermediate tank stationed near said hydrocarbon storage tank operatively connected to said opposite end of said main supply pipe;

(iv) a solvent supply pump having an inlet port operatively connected to said intermediate tank, said supply pump also having an outlet port; and (v) a solvent supply hose operatively connected between said outlet port of said supply pump and said articulatable washing means.

15. A system according to claim 14, wherein said supply pump has a pumping capacity of about 300 gallons per minute at a pressure of about 300 pounds per square inch.

16. A system according to claim 1, wherein said waste fractioning means comprises:

(i) one or more waste fractioning tanks, each having a bottom, stationed near said hydrocarbon storage tank, and fluidically connected to said waste removal means in a manner to receive said waste material therefrom;

(ii) a solvent exit pipe fluidically connected on one end to each of said waste fractioning tanks at a height sufficient to receive solvent substantially free of hydrocarbon sludge settling therein, and connected on an opposite end to said solvent supply means; and (iii) sludge return pipe fluidically connected at said bottom of each of said waste fractioning tanks to allow emptying of settled hydrocarbon sludge therein.

17. A system according to claim 1, wherein said sludge return means comprises:

(i) a sludge pump capable of pumping high viscosity hydrocarbon sludge and fluidically connected to said waste fractioning means;

(ii) a refinery return pipe connected on one end to said sludge pump and on an opposite end to a pipeline of said refinery for receiving sludge pumped by said sludge pump.

18. In a robotic cleaning system for hydrocarbon storage tanks, comprising:

(i) a light-weight, collapsible frame having robot articulation means mounted thereon for moving said frame within said tank, said tank having a floor;

(ii) nozzled articulatable washing means mounted on said frame for spraying a petroleum-based solvent on a surface to be cleaned;

(iii) waste removal means removably connectable to said frame for removing waste material comprising hydrocarbon sludge and expended solvent from said tank and transferring said waste material to waste fractioning means;

(iv) hoisting means operatively mounted on said frame for picking up, transporting and dropping off said waste removal means within said tank;

(v) hydraulic power means operatively connected with said robot articulation means, said waste removal means, and said articulatable washing means for articulating said frame and said washing means and for powering said waste removal means;

(vi) hydraulic control means operatively connected with said hydraulic power means for regulating the operation of said robot articulation means and said articulatable washing means;

(vii) solvent supply means operatively connected with said washing means for delivering said solvent to said washing means;

(viii) waste fractioning means operatively connected to said waste removal means and said solvent supply means for receiving said waste material from said waste removal means, allowing said hydrocarbon sludge to settle below said expended solvent, and delivering said expended solvent back to said solvent supply means; and (ix) sludge return means operatively connected between said waste fractioning means and a refinery pipeline for returning said hydrocarbon sludge to said refinery for further refinement;

a method of cleaning said hydrocarbon storage tanks, comprising the steps of:
(a) placing said robotically controlled frame inside said tank;
(b) supplying hydraulic power from said hydraulic power means to said robot articulation means and said washing means and supplying said solvent from said solvent supply means to said washing means;
(c) spraying said surfaces with said washing means using said solvent to dislodge said sludge from said tank;
(d) controlling said robot articulation means and said washing means outside said tank with said hydraulic control means until said sludge is satisfactorily dislodged;
(e) removing waste material comprising said sludge and said solvent sprayed from said washing means for said tank using said waste removal means;
(f) transferring said waste material to said waste fractioning means to allow said sludge to settle below said solvent;
(g) delivering said solvent in said waste fractioning means back to said solvent supply means for further spraying by said washing means; and
(h) delivering settled sludge in said waste fractioning means to a refinery for further refinement.

19. A method according to claim 18, further comprising the step of illuminating the interior of said tank by an installed lighting system prior to cleaning said tank.

20. A method according to claim 18, further comprising the step of circulating hydrocarbon fumes out of said tank by using air movers mounted on one or more entrances to said tank.

21. A robot for cleaning hydrocarbon storage tanks, comprising:
(a) a light-weight, collapsible frame having robot articulation means mounted thereon for moving said frame within said hydrocarbon storage tank, such that when said frame is in a collapsed position, said robot is of sufficient size to fit through a manhole entrance to said hydrocarbon storage tank;
(b) nozzled articulatable washing means mounted on said frame for spraying a petroleum-based solvent on a surface to be cleaned;
(c) hydraulic power means operatively connected with said robot articulation means and said articulatable washing means for articulating said frame and said washing means;
(d) hydraulic control means operatively connected with said hydraulic power means for regulating the operation of said robot articulation means and said articulatable washing means; and
(e) solvent supply means operatively connected with said washing means for delivering said solvent to said washing means;
(f) wherein said frame comprises a cross support member having a midpoint, and a rigid and hollow solvent supply tube having an front end and a rear end, said front end being pivotally attached to said midpoint of said cross support member and having an opening for allowing fluid communication between said solvent supply tube and said washing means, and said rear end having an opening to accept a solvent supply hose and also having a pivotable trailing wheel; and
(g) wherein said robot articulation means comprises:
(i) a first vertical plate attached to one end of said cross support member, and a second vertical plate attached to the opposite end of said cross support member, each said plate having a portion extending downward from said cross support member.
(ii) first and second hydraulic motors operatively attached to said downwardly extending portion of said first and second plates, respectively; and
(iii) first and second wheels operatively attached to said first and second hydraulic motors, respectively.

22. A system according to claim 21, further comprising clearing means operatively connected to said cross support member for clearing said waste material from the floor of said hydrocarbon storage tank.

23. A system according to claim 22, wherein said clearing means comprises:
(i) a support structure operatively attached to said cross support member, said support structure having a bottom edge of a width greater than or equal to the distance between the outer edges of said first and second wheels; and
(ii) a rubberized, chemically resistant strip operatively attached to said bottom edge of said support structure such that said strip is in wiping contact with said floor of said storage tank.

24. A robot for clearing hydrocarbon storage tanks, comprising:
(a) a light-weight, collapsible frame having robot articulation means mounted thereon for moving said frame within said hydrocarbon storage tank, such that when said frame is in a collapsed position, said robot is of sufficient size to fit through a manhole entrance to said hydrocarbon storage tank;
(b) nozzled articulatable washing means mounted on said frame for spraying a petroleum-based solvent on a surface to be cleaned;
(c) hydraulic power means operatively connected with said robot articulation means and said articulatable washing means for articulating said frame and said washing means;
(d) hydraulic control means operatively connected with said hydraulic power means for regulating the operation of said robot articulation means and said articulatable washing means; and
(e) solvent supply means operatively connected with said washing means for delivering said solvent to said washing means;
(f) wherein said nozzled articulatable washing means comprises:
(i) a 2-degree of freedom tubing system operatively connected to said solvent supply means and terminating in a nozzle;
(ii) horizontal control means operatively attached to said tubing system for causing said tubing system to spray said solvent in a horizontal arc; and
(iii) vertical control means operatively attached to said tubing system for causing said tubing system to spray said solvent in a vertical arc.

25. A system according to claim 24, wherein said tubing system comprises:
(i) a first tube assembly;
(ii) a horizontal rotary joint operatively attached between one end of said first tube assembly and said solvent supply means to allow horizontal rotation and fluidic communication between said first tube assembly and said solvent supply means;
(iii) a vertical rotary joint operatively attached to an opposite end of said first tube assembly to allow vertical rotation and fluidic communication between said first tube assembly and a second tube assembly;
(iv) a second tube assembly operatively attached on one end to said vertical rotary joint; and
(v) a nozzle operatively attached to an opposite end of said second tube assembly.

26. A system according to claim 25, wherein said horizontal control means comprises:
(i) a first horizontal sprocket operatively attached to said first tube assembly;
(ii) a hydraulic horizontal motion motor operatively attached to said frame, said motor having a motor shaft;
(iii) a second horizontal sprocket operatively attached to said motor shaft; and
(iv) a sprocket chain operatively disposed between said first and second horizontal sprockets; and
wherein said vertical control means comprises a hydraulic ram pivotally attached on one end to said first tube assembly and on an opposite end to said second tube assembly in a manner to produce vertical motion of said nozzle.

27. A system according to claim 26, wherein said hydraulic control means comprises:
(i) first, second, third, and fourth hydraulic fluid supply lines interconnected between said first and second hydraulic motors, said horizontal motion motor, and said hydraulic ram, respectively, and said hydraulic power means;
(ii) first, second, third, and fourth hydraulic return lines interconnected between said first and second hydraulic motors, said horizontal motor, and said hydraulic ram, respectively, and said hydraulic power means; and
(iii) first, second, third, and fourth 4-way directional control valves operatively connected to said first, second, third, and fourth hydraulic supply and return lines between said first and second hydraulic motors, said horizontal motion motor, and said hydraulic ram, respectively, and said hydraulic power means.

* * * * *